United States Patent [19]
Hughes

[11] 3,777,859
[45] Dec. 11, 1973

[54] LOCKING MEANS FOR VEHICLE WHEEL BRAKES

[75] Inventor: Michael James Hughes, Tyseley, Birmingham, England

[73] Assignee: Girling Limited, Birmingham, England

[22] Filed: June 16, 1971

[21] Appl. No.: 153,671

[30] Foreign Application Priority Data
June 24, 1970 Great Britain.................. 30,651/70

[52] U.S. Cl......................... 188/265, 92/17, 303/89
[51] Int. Cl............................................ F16d 51/00
[58] Field of Search...................... 188/265; 303/89; 92/17

[56] References Cited
UNITED STATES PATENTS

| | | | |
|---|---|---|---|
| 2,804,053 | 8/1957 | Geyer | 92/17 |
| 3,613,841 | 10/1971 | Newstead | 188/265 |
| 3,472,124 | 10/1969 | Roselius et al. | 188/265 |
| 3,586,138 | 6/1971 | Engle | 188/265 |
| 3,684,063 | 8/1972 | Crabtree | 92/17 X |

*Primary Examiner*—George E. A. Halvosa
*Attorney*—Scrivener, Parker, Scrivener and Clark

[57] ABSTRACT

A lock actuator, preferably incorporated in a wheel cylinder, for a vehicle wheel brake includes an extensible strut and a friction clutch selectively operable for locking the strut in extended position, and is mainly characterized by the provision of a fluid pressure actuated motor for effecting engagement of the clutch whereby to obtain rapid and positive response to selection of the locked condition. The said motor may be opposed and normally overpowered by a second motor acting in the opposite direction, clutch engagement being effected by disabling the second motor which the first remains operative.

8 Claims, 4 Drawing Figures

LOCKING MEANS FOR VEHICLE WHEEL BRAKES

This invention relates to lock actuators for vehicle wheel brakes, including clutch means selectively operable to effect locking and unlocking of an adjustable length strut which, in use, is normally unlocked and free to extend and contract to follow up movements of a brake applying member, but which can be locked in an extended position to lock the said member in a brake applying position.

The invention will be seen from the following description to be applicable to various forms of lock actuator of the form described above, whether made in separate units, or, as in the specific embodiments described herein, incorporated in brake actuating units such as hydraulic slave wheel cylinders.

Previously proposed lock actuators of the general form referred to above have employed springs for effecting engagement of the clutch when the lock is brought into operation, but the response time tends to be unduly long, due to the time taken for the spring to accelerate the clutch part and move it the required distance. This delay can result in a considerable degree of "lost motion" arising in the sense that the strut will start to contract, under the external forces applied to it, prior to engagement of the friction clutch. Furthermore, limitations of space usually mean that a fairly weak spring is employed, so that the closing force of the clutch is not as high as would desirably be the case.

It is a primary object of the invention to provide a lock actuator capable of responding quickly and positively to a signal calling for locking of the strut, and in accordance with the invention there is provided a lock actuator for a vehicle wheel brake, comprising an extensible strut, a friction clutch associated with the strut and having an engaged condition in which it locks the strut against contraction, the strut otherwise being free to extend and contract, and a fluid pressure actuated motor means for effecting engagement of the clutch.

In the particular embodiments described below, an axially movable clutch member is subjected to the axially opposed action of two separate motors, one exerting a force in the clutch engaging direction and the other normally exerting a greater force in the opposite direction, the clutch being engaged when the force of the second motor is removed.

Some embodiments of the invention, each comprising a combined wheel cylinder and lock actuator, will now be described, by way of example only, with reference to the accompanying drawings, in which.

Figure 1:
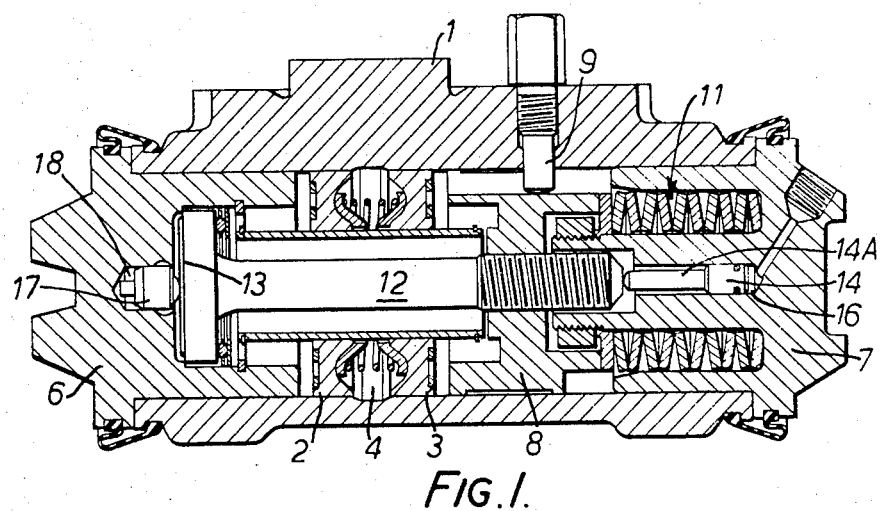
FIG. 1 is an axial section of one embodiment of wheel cylinder incorporating the present invention.

The combined wheel cylinder and lock actuator of FIG. 1 comprises a cylinder body 1 housing two pistons 2 and 3 defining between them a main working chamber 4. The left hand piston 2 works directly against a tappet 6 and the right hand piston 3 acts on the opposed tappet 7 through the intermediary of a nut member 8 (keyed against rotation by a pin 9) and a resilient overload device comprising a stack of belleville washers 11 alternately reversed with respect to their conicity. A screwed spindle member 12 having threaded engagement in the nut member 8 through a reversible screw threaded connection is formed at its left hand end with an enlarged head whose outer (left hand) face 13 is capable of frictional, clutching engagement with an internal surface of the tappet 6. The tappet is fixed, in use, against rotation and effectively forms a stationary clutch member, while the spindle 12 forms a cooperating rotary clutch member. At its right hand end, the spindle 12 is engaged by the projecting stem 14A of a piston 14 working in an auxiliary chamber 16 formed in the right hand tappet 7. This chamber 16 is arranged to be pressurised whenever the main chamber 4 is pressurised, so that under these circumstances the piston 14 applies a biasing force tending to engage the friction clutch. However, a larger and oppositely directed biasing force is normally provided by a second motor comprising a second auxiliary piston 17 working in a chamber 18 formed in the tappet 6. This piston 17 has a domed head to reduce its frictional contact with the head of spindle 12, so that when the chamber 18 is pressurised, the piston 17 holds the head of the spindle away from clutching engagement with the tappet 6 and frees the spindle for rotation. In this condition the adjustable length strut formed by the parts 8 and 12 is free to extend and contract in following up movements of the tappets 6 and 7 during brake application and release.

To apply the lock, the chambers 4, 16 and 18 are pressurised to apply the brake and allow the strut parts to follow out the respective tappets. The chamber 18 is then relieved of pressure, whereupon the piston 14 moves the spindle 12 to the left to engage the friction clutch and thereby lock the strut parts in this extended condition. Next, the pressure in chamber 4 is relieved, after which the final step is to relieve the pressure in chamber 16. The lock will then remain applied (until the chamber 18 is next pressurised) by virtue of the shoe retraction forces applied to the strut and clutch through the tappets 6 and 7, which thus act as thrust transmitting members.

The remaining embodiments are generally similar in their construction and operation, and only the differences over FIG. 1 will now be described. The same reference numerals are used to identify corresponding parts in the four Figures.

Figure 2:
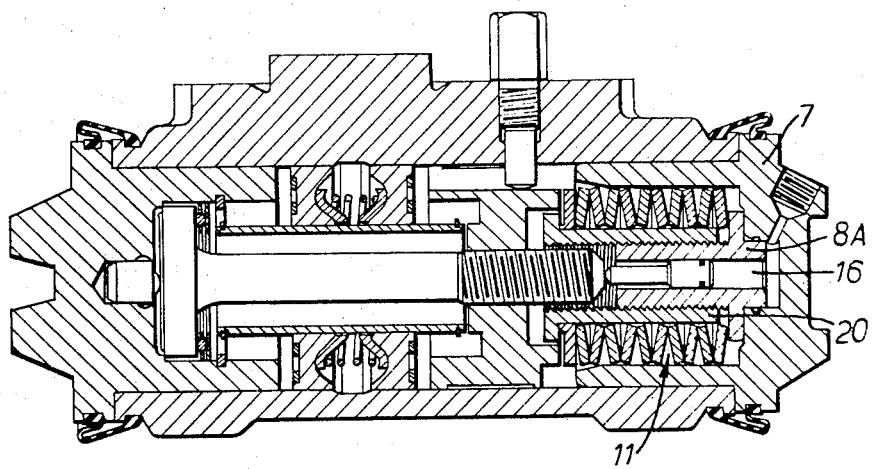
FIG. 2 is an axial view of a second embodiment.
Figure 3:
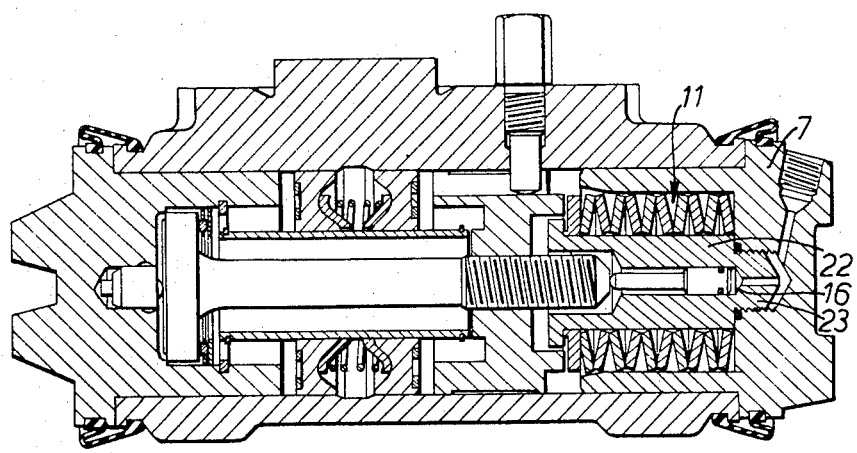
FIG. 3 is an axial view of a third embodiment.

In FIG. 2 the auxiliary chamber 16 is formed in a bush insert 8A screwed into a tubular housing or spigot 20 which forms a carrier for locating the belleville washers 11 and a spigot 21 at the right hand end of the insert 8A is sealingly received in a socket in the tappet 7. This construction although slightly more elaborate, is easier to assemble than that of FIG. 1. This is also true of the embodiment of FIG. 3 in which the chamber 16 is formed in a tubular spigot member 22 which forms a carrier for the belleville washers and has a screw threaded spigot 23 by which it is secured in the right hand tappet 7.

Figure 4:
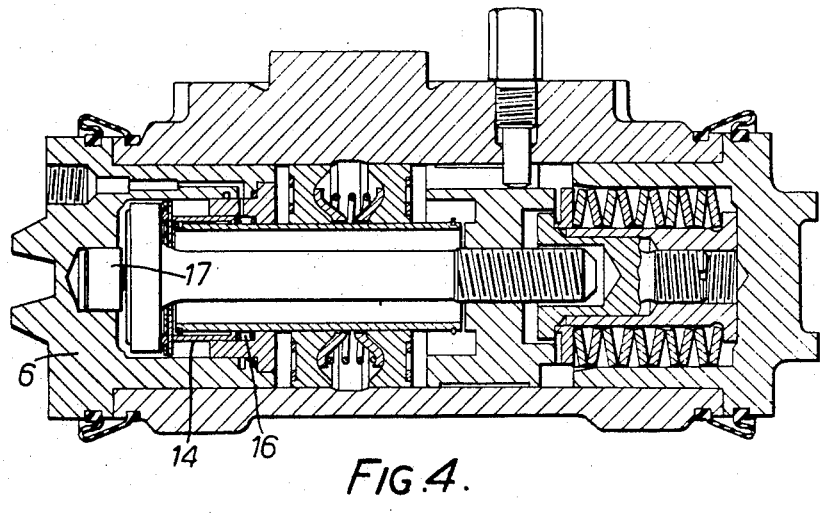
FIG. 4 is an axial view of fourth embodiment.

Finally, in the embodiment of FIG. 4, the first Auxiliary piston 14 takes the form of an annular piston working in an annular cylinder 16 accommodated within the left hand tappet 6 and concentrically surrounding the spindle member 12, the piston 14 being engageable with the adjacent inner face of the enlarged head of the spindle.

I claim:

1. A lock actuator for a vehicle wheel brake comprising an extensible strut; a friction clutch associated with said strut and having first and second relatively movable parts which in a first engaged position lock said strut against contraction and in a second disengaged position allow said strut to move between extended and contracted positions, means for effecting engagement and disengagement of said clutch comprising a first fluid pressure operated motor disposed on one side of both parts of said clutch and operable in one direction on one of said parts, a second fluid pressure operated motor disposed on the opposite side of both parts of said clutch and operable to act on said one clutch part in unison with but in opposition to the first motor, said motors being constructed and arranged that when operated in unison upon application of the brake one of said motors has a greater force output than the other which acts in a direction on said one part to effect clutch disengagement, deactivation of said one motor enabling the other to act on said one part to effect clutch engagement.

2. The lock actuator of claim 1 wherein said strut comprises an elongated spindle carrying at one end said one clutch part, the motor having the greater force output acting in an axial direction on one end of the spindle and the other motor acting in opposition to the first motor on the opposite end of said spindle.

3. A lock actuator for a vehicle wheel brake, comprising an extensible strut; a friction clutch associated with said strut and having an engaged condition in which it locks said strut against contraction; first and second fluid pressure operated motor means operable upon brake application, said first fluid pressure motor means being arranged to effect engagement of said clutch and said second fluid pressure motor means being operable to act on said clutch in unison with but in opposition to the first motor means and having a greater force output than said first motor means, both said motor means being constructed and arranged that operation of said first and second motor means in unison effects clutch disengagement, and disability of said second motor means effects engagement of said clutch by said first motor means.

4. The lock actuator of claim 3 when incorporated in an hydraulically actuated wheel cylinder and acting between opposed thrust transmitting members thereof.

5. The lock actuator of claim 3, comprising first and second relatively axially movable strut parts constituting said strut; first and second thrust transmitting members associated with said first and second strut parts, respectively, for transmitting thrust thereto; a friction clutch face formed on said first thrust transmitting member; and a clutch part formed on said first strut part for co-operation with said clutch face and movable into and out of clutching engagement therewith; and wherein said first thrust transmitting member houses said second motor means, and said first motor means acts directly on said first strut part.

6. The lock actuator of claim 5, wherein said first motor means comprises a cylinder fast with said second thrust transmitting member and a piston in said cylinder and acting on said first strut part.

7. The lock actuator of claim 5, comprising spigot means defining said cylinder, and a plurality of annular spring washers in compressive pre-loaded condition, acting between said second thrust transmitting members and said second strut part, and located over said spigot means.

8. The lock actuator of claim 5, comprising an enlarged head at one end of said first strut part and constituting said clutch part, and wherein said second motor means comprises an annular cylinder and a cooperating annular piston carried by said first thrust transmitting member and concentrically surrounding said first strut part to one side of said head, said annular piston being engageable with said head to urge the same towards said friction clutch face.

* * * * *